United States Patent
Kondo et al.

(10) Patent No.: US 6,463,179 B1
(45) Date of Patent: *Oct. 8, 2002

(54) IMAGE COMPRESSION AND DECOMPRESSION BASED ON A FLAT PIXEL GROUP LEVEL, GROUP PIXEL COORINDINATE POSITIONS, AND THE NUMBER OF PIXELS FOR THE GROUP

(75) Inventors: Tetsujiro Kondo, Tokyo; Takashi Horishi, Kanagawa, both of (JP)

(73) Assignee: Sony Corporation, Tokyo (JP)

( * ) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 0 days.

(21) Appl. No.: 09/574,136

(22) Filed: May 18, 2000

Related U.S. Application Data

(63) Continuation of application No. PCT/JP99/05167, filed on Sep. 21, 1999.

(30) Foreign Application Priority Data

Sep. 21, 1998 (JP) .......................................... 10-266985

(51) Int. Cl.[7] .............................. G06K 9/36; G06K 9/46
(52) U.S. Cl. ........................ 382/239; 382/166; 382/233
(58) Field of Search .................................. 382/166, 232, 382/234, 236, 239, 240, 243; 358/261.2, 430, 432–433; 348/394.1, 397.1, 400.1–401.1, 409.1, 411.1, 412.1, 415.1, 420.1, 421.1; 375/240.02, 240.12, 240.14, 240.25, 240.08, 240.1, 244

(56) References Cited

U.S. PATENT DOCUMENTS

| | | | |
|---|---|---|---|
| 4,788,598 A | | 11/1988 | Ochi et al. .................. 358/260 |
| 5,225,904 A | * | 7/1993 | Golin et al. ........... 375/240.12 |
| 5,524,067 A | * | 6/1996 | Miyake et al. .............. 382/234 |
| 5,552,832 A | * | 9/1996 | Astle ........................ 348/420.1 |
| 5,570,203 A | * | 10/1996 | Suzuki et al. ............... 358/432 |
| 5,978,514 A | * | 11/1999 | Yamaguchi et al. ........ 382/243 |
| 5,982,938 A | * | 11/1999 | Dube ........................ 382/240 |
| 6,035,070 A | * | 3/2000 | Moon et al. ................ 382/243 |

* cited by examiner

Primary Examiner—Timothy M. Johnson
(74) Attorney, Agent, or Firm—Frommer Lawrence & Haug LLP; William S. Frommer; Bruno Polito

(57) ABSTRACT

An encoding apparatus whereby image signals provided in units of frames, each having a plurality of pixels, are divided into macro groups, and the pixels in each macro group are combined, forming a group. The pixels of the group are encoded on the basis of the level data representing the signal level of the representative pixel in the group, the position data concerning all pixels of the group and the data representing the number of the pixels existing in the group.

32 Claims, 11 Drawing Sheets

FIG.10
FIG.11A  PATTERN 1 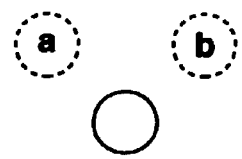
FIG.11B  PATTERN 2 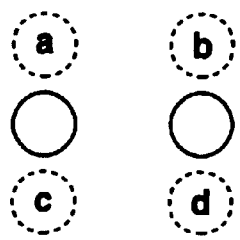
FIG.11C  PATTERN 3 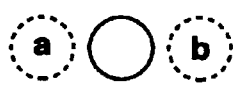
FIG.11D  PATTERN 4 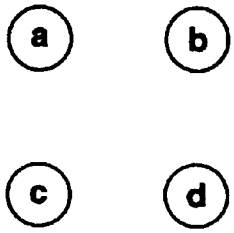

IMAGE COMPRESSION AND DECOMPRESSION BASED ON A FLAT PIXEL GROUP LEVEL, GROUP PIXEL COORINDINATE POSITIONS, AND THE NUMBER OF PIXELS FOR THE GROUP

This is a continuation of copending International Application PCT/JP99/05167 having an international filing date of Sep. 21, 1999.

TECHNICAL FIELD

The present invention relates to an apparatus and method for encoding images, and also to a decoding apparatus and method for decoding coded data.

BACKGROUND ART

Hitherto, television signals have been encoded by using data about the surrounding of the pixels to be transmitted. This is because an image generally exhibits acute auto correlation with a neighboring region. Thus, the data about the neighboring region should be used to compress data efficiently.

From a microscopic point of view, however, any correlation cannot be said to exist at an edge part of an image, where the signal greatly change, whereas the correlation is strong at a flat part where the signal does not change.

In such a case, that part where the correlation is strong is encoded by fully using the strong correlation, while the edge part is encoded by applying a suitable amount of data or is encoded within a scope where visual masking effect can be obtained.

In the conventional encoding method described above, an image is encoded by applying an appropriate amount of data for an edge part of an image. There is inevitably a limit to the reduction of data. That is, the encoding efficiency is low.

DISCLOSURE OF INVENTION

The present invention has been made in view of the foregoing. An object of the invention is to provide an encoding apparatus and method which can reduce an amount of data even at an edge part and which can encode signal values with high efficiency.

Another object of the present invention is to provide a decoding apparatus and method which can easily decode an image encoded in accordance with its characteristics and then transmitted.

Accordingly, an encoding apparatus according to the present invention is characterized by comprising: a data-grouping section for dividing a plurality of pixel data items of an image signal, into groups, in accordance with characteristics of the image signal; and an encoding section for encoding the pixel data items of each groups on the basis of level data representing a signal level of a representative pixel data item of the group and position data concerning all pixel data of the group.

A decoding apparatus according to the invention is designed to decode a plurality of pixel data items having a specific order from a plurality of coded pixel data items which have been generated by dividing image signals, each composed of pixel data items having the specific order into a plurality of groups in accordance with characteristics of the image signals and by encoding the pixel data items of each group on the basis of level data representing a signal level of a representative pixel data of the group and position data concerning all pixel data items of the group. The decoding apparatus is characterized by comprising: a level-data extracting section for extracting the level data from the coded pixel data items of each group; a position-data extracting section for extracting plurality of position data items from the coded pixel data items of each group; and a data-converting section for converting the pixel data items of each group to ones arranged in the specific order, on the basis of the level data extracted by the level-data extracting section and the plurality of position data items extracted by the position-data extracting section.

An encoding method according to the present invention is characterized by comprising: a step of dividing a plurality of pixel data items of an image signal, into groups, in accordance with characteristics of the image signal; and a step of encoding the pixel data items of each groups on the basis of level data representing a signal level of a representative pixel data item of the group and position data concerning all pixel data of the group.

A decoding method according to the invention is designed to decode a plurality of pixel data items having a specific order from a plurality of coded pixel data items which have been generated by dividing image signals, each composed of pixel data items having the specific order into a plurality of groups in accordance with characteristics of the image signals and by encoding the pixel data items of each group on the basis of level data representing a signal level of a representative pixel data of the group and position data concerning all pixel data items of the group. The decoding method is characterized by comprising: a step of extracting the level data from the coded pixel data items of each group; a step of extracting plurality of position data items from the coded pixel data items of each group; and a step of converting the pixel data items of each group to ones arranged in the specific order, on the basis of the level data thus extracted and the plurality of position data items thus extracted.

BRIEF DESCRIPTION OF THE DRAWINGS

FIG. 10 is a diagram showing four pixels forming a 2×2 block, explaining how the encoder of FIG. 9 extracts pixels;

FIGS. 11A, 11B, 11C and 11D are diagrams illustrating four patterns in which the encoder of FIG. 9 extracts pixels.

BEST MODE FOR CARRYING OUT THE INVENTION

Figure 1:
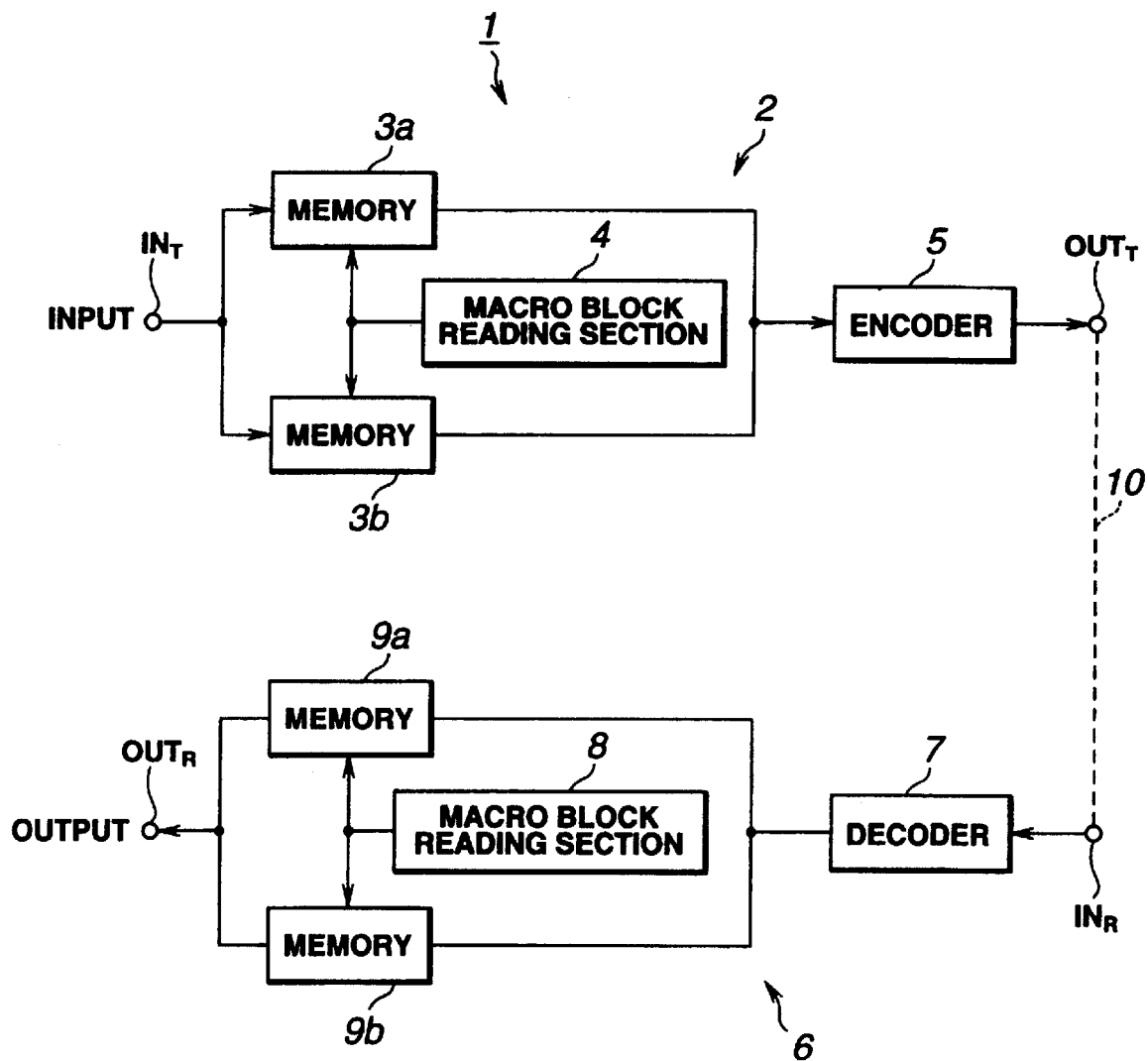
FIG. 1 is a block diagram showing an image-processing system that is an embodiment of the present invention.

An embodiment of the present invention will be described, with reference to the accompanying drawings. The embodiment is such an image-processing system 1 as is shown in FIG. 1. The system 1 comprises an encoding apparatus 2, a transmission medium 10, and a decoding apparatus 6. The encoding apparatus 2 encodes digital pixel data and outputs coded image data. The transmission medium 10 transmits the coded image data output by the encoding apparatus 2. The decoding apparatus 6 receives and decodes the coded image data transmitted by the transmission medium 10.

The encoding apparatus 2 divides image signals provided in units of frames, each having a plurality of pixel data items, into macro groups. The pixel data items which exist in each macro group and which are correlated are combined, forming a group. The encoding apparatus 2 encodes the pixel data items of the group, in accordance with the signal-level data representing the level of the representative pixel data item in the group, the address data of all pixel data items of the group, and pixel-number data representing the number of pixels existing in the group. The grouping of the pixel data item may be performed either in units of frames or in units of fields.

The decoding apparatus 6 decodes the coded pixel data items in the macro block transmitted from the encoding apparatus 2 through the transmission medium 10, in the order the pixel data items are arranged in the macro block. To decode the pixel data items, the decoding apparatus uses the signal-level data extracted from the coded pixel data items, the above-mentioned address data and the aforementioned pixel-number data.

The encoding apparatus 2 and the decoding apparatus 6 will be described. In the present embodiment, the image signals provided in units of frames, each having a plurality of pixel data items, are divided into macro groups, and the pixel data items in each macro group are combined, forming a group, and then encoded.

In the encoding apparatus 2 shown in FIG. 1, digital pixel data items are input to an input terminal INt in the order they have been raster-scanned. The pixel data items are accumulated in memories 3a and 3b. The memories 3a and 3b are of bank-switching structure. That is, the pixel data items of a macro block are written into one of the memories 3a and 3b, while the pixel data items of another macro block are being read from the other of the memories 3a and 3b. Therefore, a macro block reading section 4 can read the pixel data items of one macro block at a time and the pixel data items of another macro block at a different time.

The image data that the macro block reading section 4 has read in units of macro blocks is supplied to an encoder 5. The encoder 5 evaluates the correlation among the pixel data items in each macro block, forming groups of pixel data items, reduces redundancy in each of the groups, and outputs coded pixel data.

Figure 2:
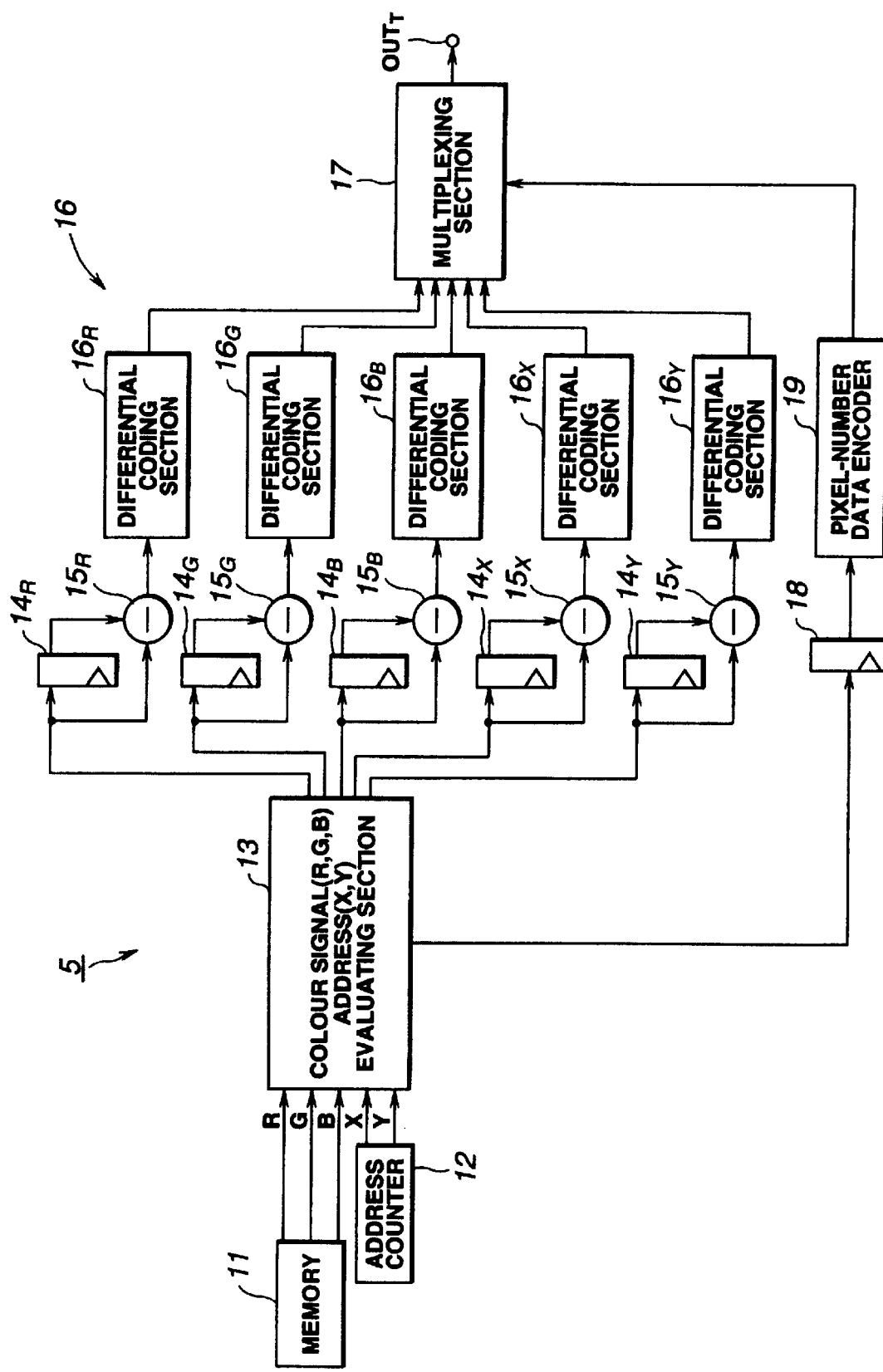
FIG. 2 is a block diagram showing in detail the encoder provided in the encoding apparatus of the image-processing system.

FIG. 2 shows the structure of the encoder 5. The encoder 5 comprises a memory 11, an evaluating section 13, a differential coding section 16, and a multiplexing section 17. The memory 11 temporarily stores the pixel data the macro block reading section 4 shown in FIG. 1 has read in units of macro blocks. The evaluating section 13 evaluates the correlation of the signal-level data of the pixel data item representing a group to be formed of the pixel data items stored in the memory 11 in units of macro blocks, with respect to the signal-level data of the other pixel data items. The section 13 also evaluates the correlation between the address data of the pixel data item representing the group and the address data of the other pixel data items. The differential coding section 16 encodes the pixel data items of each group formed by evaluating the correlation by the evaluating section 13 in accordance with three types of data. The first type is the signal-level data of the pixel data item representing the group. The second type is the address data of all pixel data items of the group. The third type is the pixel-number data representing the number of all pixel data items of the group. The multiplexing section 17 multiplexes the differential coded data output from the differential coding section 16. The encoder 5 has an address counter 12, which counts address data items of all pixel data items of the group.

Figure 3:
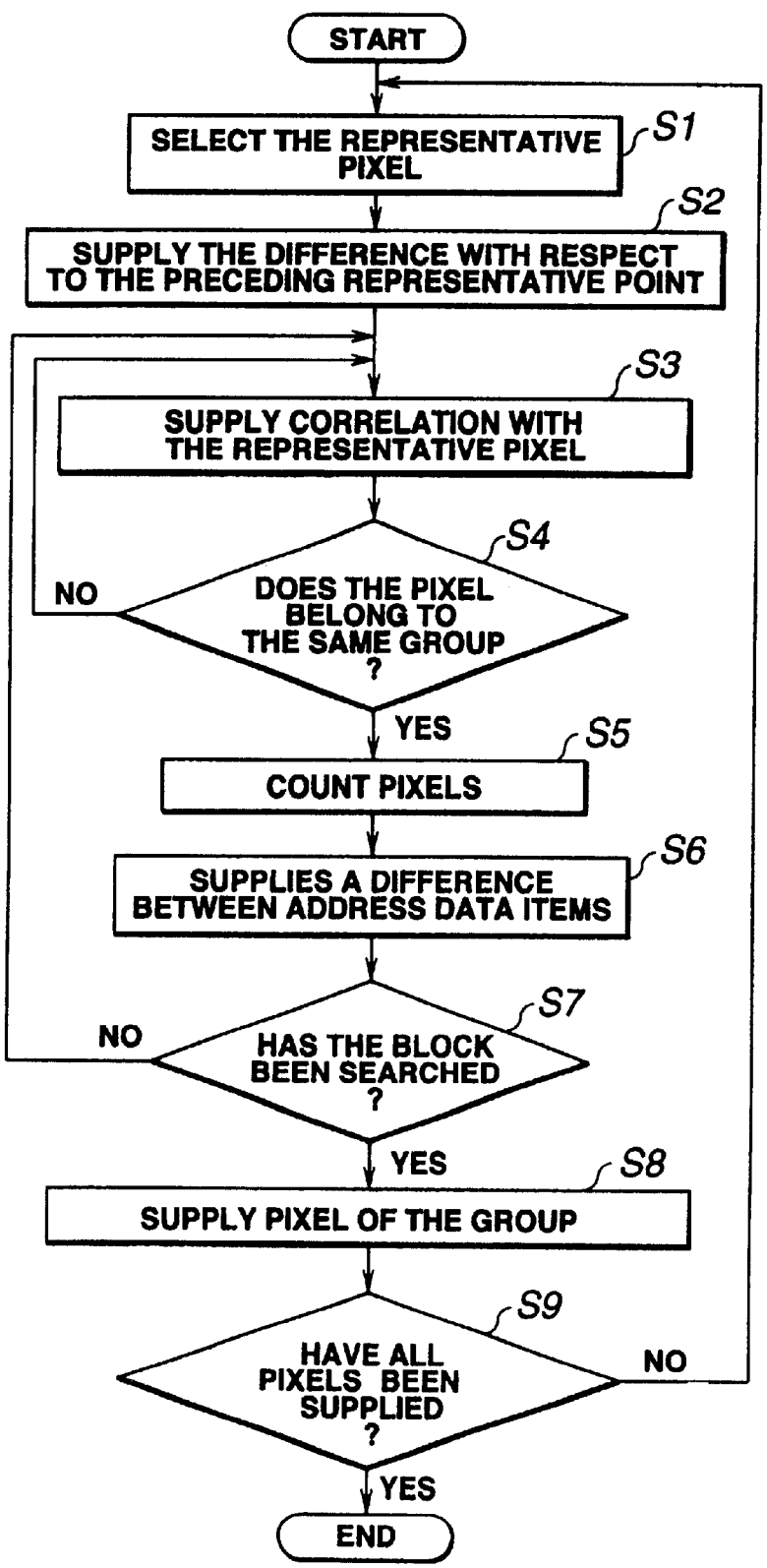
FIG. 3 is a flow chart explaining the operation of the encoding apparatus.
Figure 4:
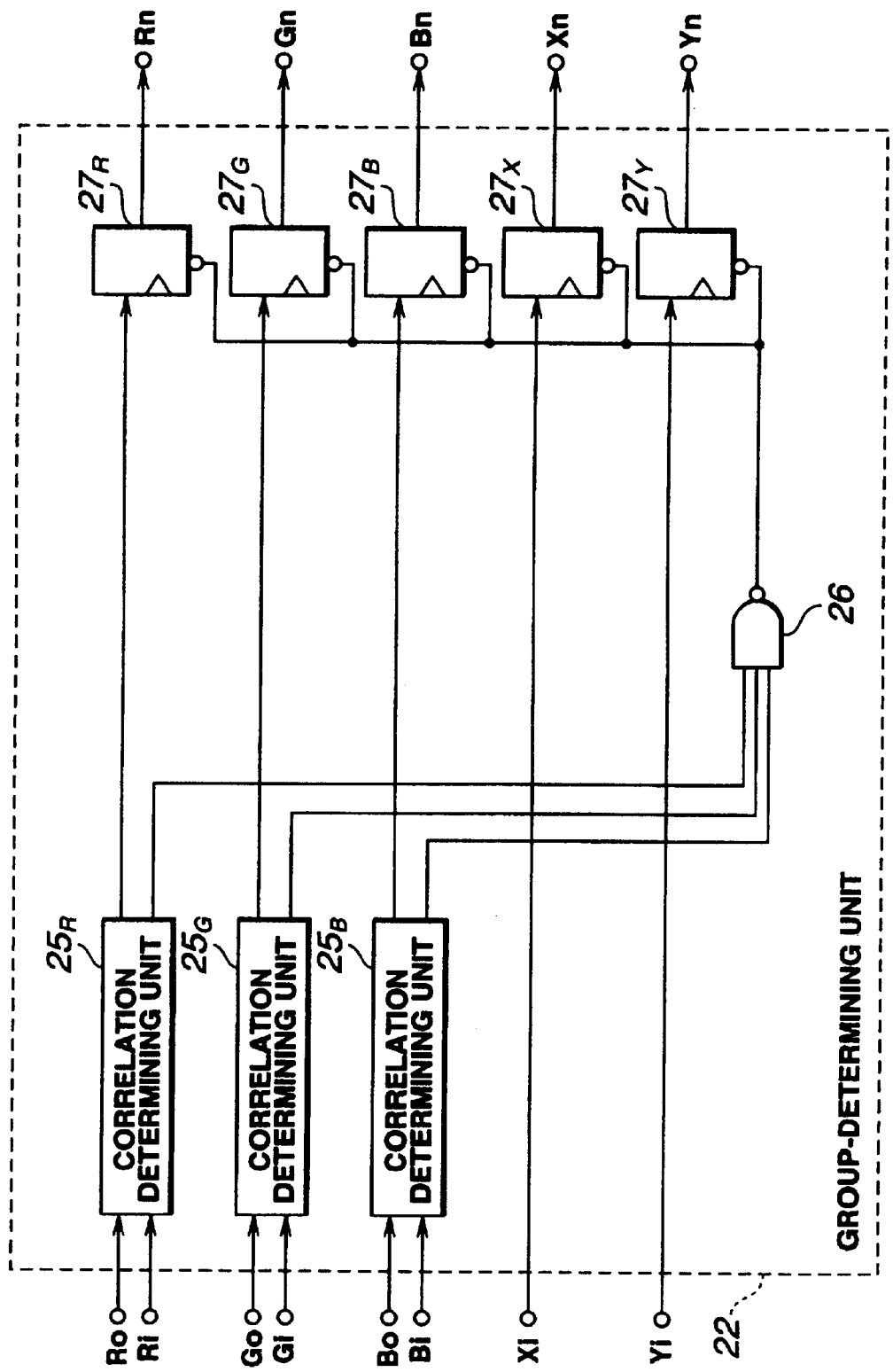
FIG. 4 is a block diagram illustrating in detail the group-determining unit incorporated in the encoder.
Figure 5:
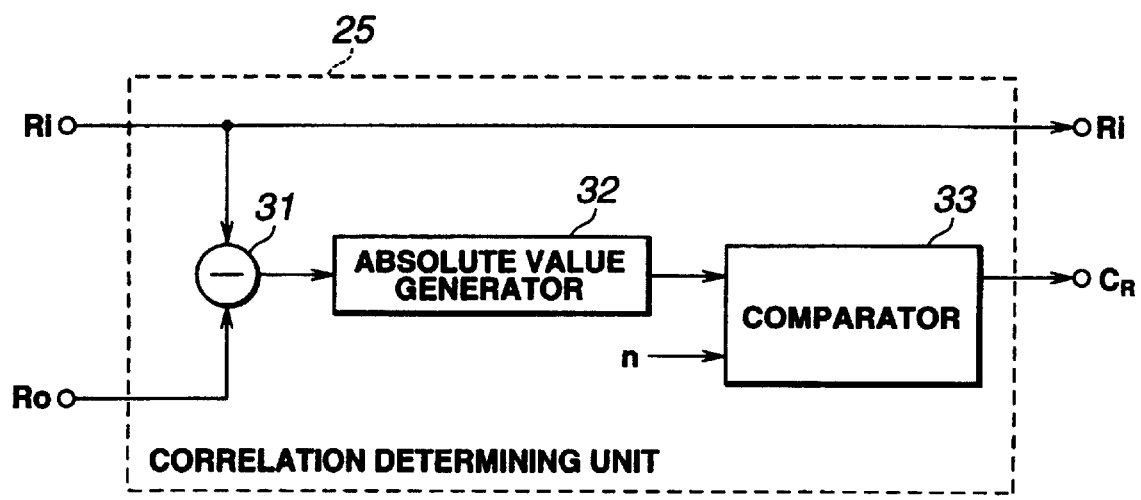
FIG. 5 is a block diagram showing in detail the correlation-determining unit used in the group determining unit.

The operation of the encoder 5 and the components that enable the encoder 5 to operate will be described first, with reference to the flow chart of FIG. 3 and FIGS. 4 and 5 showing the evaluating section 13 in detail.

The encoder 5 first selects a representative pixel data item in Step S1. To select the representative pixel data item, an optimal method may be used that is based on a prescribed algorithm.

Then, the encoder 5 finds the difference between the signal-level data of the representative pixel data item selected in Step S1 and the signal-level data of the representative pixel data items of the other groups in the same macro block, by using a register $14_R$, a register $14_G$, a register $14_B$, a subtracter $15_R$, a substracter $15_G$ and a substracter $15_B$. The difference obtained is supplied to the differential coding section 16 (Step S2). Like Step S6 that will be described later, this process precedes the differential coding that the differential coding section 16 effects in the encoder 5. In the present invention, the signal-level data of the representative pixel data item is RGB-tricolor signal-level data. The signal-level data of the pixel data items are also RGB-tricolor signal-level data. Instead, the signal-level data may of course be luminance signal Y, blue difference signal Cb and red difference signal Cr.

Next, the evaluating section 13 of the encoder 5 evaluates the correlation between the representative pixel data item selected in Step S1 and a given pixel data item in the same macro block (Step S3). In Step S4, it is determined whether the given pixel data item should be considered as belonging to the same group.

More specifically, the correlation between the RGB-tricolor signal-level data $(R_0, G_0, B_0)$ of the representative pixel data item and the signal-level data $(R_i, G_i, B_i)$ of a given pixel data item in the same macro block is evaluated by using the following equations (1), thereby determining whether the given pixel data item is of the same group or not.

$$|R_0-R_i|<=n, \ |G_0-G_i|<=n, \text{ and } |B_0-B_i|<=n \tag{1}$$

Namely, $|R_0-R_i|$, $|G_0-G_i|$ and $|B_0-B_i|$ are equal to or less than a predetermined value n. This means that the representative pixel data item and the given pixel data item in the same macro block have high correlation between them. The evaluating section 13 has a group-determining unit 22, which is shown in FIG. 4. The group-evaluating unit 22 comprises correlation determining units $25_R$, $25_G$ and $25_B$, a NAND gate 26, and registers $27_R$, $27_G$ and $27_B$. The correlation determining units $25_R$, $25_G$ and $25_B$ receive the signal-level data of the representative pixel data item and the signal-level data of the given pixel data item. The NAND gate 26 receives the outputs of the correlation determining units $25_R$, $25_G$ and $25_B$. The registers $27_R$, $27_G$ and $27_B$ receive the control signal supplied from the NAND gate 26. The control signal will be described later.

The correlation determining units $25_R$, $25_G$ and $25_B$ determine the correlation values $|R_0-R_i|$, $|G_0-G_i|$ and $|B_0-B_i|$, respectively. The correlation values the units $25_R$, $25_G$ and $25_B$ have determined may be equal to or less than the threshold value (strain n). In other words, the representative pixel data item and the given pixel data item have high correlation. If so, the NAND gate 26 supplies the control signal to the registers $27_R$, $27_G$ and $27_B$, which will be described later. The registers $27_R$, $27_G$ and $27_B$ receive the signal-level data ($R_i$, $G_i$, $B_i$) of the given pixel data item supplied via the correlation determining units $25_R$, $25_G$ and $25_B$. The registers $27_R$, $27_G$ and $27_B$ then outputs the signal-level data ($R_i$, $G_i$, $B_i$) in response to the control signal supplied from the NAND gate 26. The signal-level data will be used as pixel data that satisfies the above equation (1).

The group evaluating unit 22 has registers $27_X$ and $27_Y$, which output the address data X and Y of the given pixel data item that satisfies the equation (1).

Each of the correlation determining units 25 (e.g., unit $25_R$) comprises a subtracter 31, an absolute value generator 32 and a comparator 33, as is illustrated in FIG. 5. The subtracter 31 subtracts the level data $R_i$ (post-value) of the given pixel data item from the signal-level data $R_0$ (pre-value). The absolute value generator 32 generates the absolute value of the result of the subtraction. The comparator 33 compares the absolute value with the threshold value n. The difference $C_R$ between the absolute value and the threshold value n is output to the NAND gate 26 shown in FIG. 4. The level data $R_i$ (post-value) of the given pixel data item is supplied to the register $27_R$.

If it is determined in Step S4 that the given pixel data item does not belong to the same group as the representative pixel data item, the flow returns to Step S3. Then, Steps S3 and S4 are repeated on another given pixel data item.

The evaluating section 13 counts the given pixel data items that have been regarded in Step S4 as belong to the same group (Step S5). The count thus obtained is the data showing the number of pixels existing in the same group.

Thereafter, in the encoder 5, the differential coding section 16 performs encoding. Prior to this encoding, the register $14_X$ and $14_Y$ and the substracters $15_X$ and $15_Y$ are used in Step S6, the difference between the given pixel data items is obtained and supplied to the differential coding section 16. In Step S6, the address data of the representative pixel data item is also generated, by means of subtraction, from the address data of the representative pixel data item of another group that has been encoded in the same macro block.

Next, the encoder 5 determines whether the given pixel data items have been found in the macro block, that is, whether the entire macro block has been searched. If the given pixel data items have not been found, Steps S3 to S6 are repeated. If the given pixel data items have been found, the flows goes to Step S8, in which the pixel data items belonging to the group are supplies via a register 19 to a pixel-number data encoder 19.

The encoder 5 repeats Steps S1 to S8 until it is determined that all pixel data items in the macro group haven been supplied to a pixel-number data encoder 19. That is, in the encoder 5, the groups of pixel data items, which belong to the macro block, are processed, and the difference data items and pixel data items are supplied to the encoders.

Figure 6:
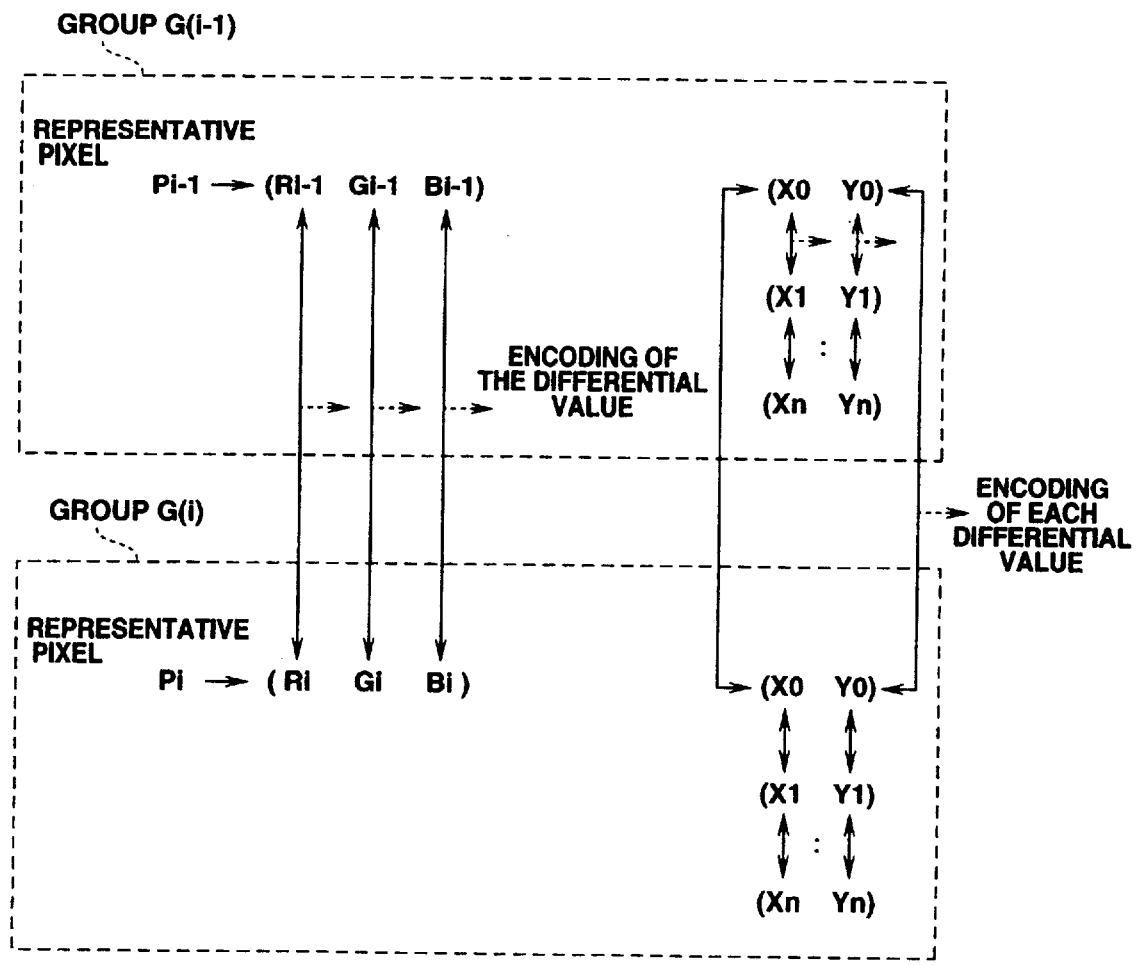
FIG. 6 is a diagram for explaining how the encoder generates differential codes.

Then, the encoder S uses the differential encoders $16_R$, $16_G$, $16_B$, $16_X$ and $16_Y$ of the differential coding section 16, thereby encoding the signal levels R, G and B of the representative pixel data item and the address data of each pixel data item in the group. (It should be noted that each signal level is the difference between one representative pixel data item and that of the immediately preceding group. The address data of the pixel data item is obtained from the difference between the address data of one pixel data item and the address data of the representative pixel data item, which in turn is the difference between the address data of the representative pixel data item and that of the representative pixel data item of the immediately preceding group.) As shown in FIG. 6, in the encoder 5, the differential encoders $16_R$, $16_G$ and $16_B$ encode the signal-level data ($R_i$, $G_i$, $B_i$) of the representative pixel data item Pi of a group G(i), that is to be transmitted. The differential encoders $16_R$, $16_G$ and $16_B$ also encode the differential value of the signal-level data ($R_{i-1}$, $G_{i-1}$, $B_{i-1}$) of the representative pixel data item $P_{i-1}$ in the other group G (i-1) that has been encoded immediately before the group G(i). Further, the differential encoders $16_X$, and $16_Y$ encode the address data items ($X_1$, $Y_1$), ... ($X_n$, $Y_n$) of the pixel data items, with respect to the address data ($X_0$, $Y_0$) of the representative pixel data item Pi of the same group, which has been obtained as a difference from the address data of the representative pixel data item $P_{i-1}$ of the preceding group. Moreover, the encoder 5 utilizes the pixel-number data encoder 19, thereby encoding the pixel data items within the group. The differential encoding effected in the encoder 5 may be DPCM (Differential Pulse Code Modulation) or an encoding method in which the frequency of differential values is optimized and then encoded by using Haffman codes.

Figure 7:
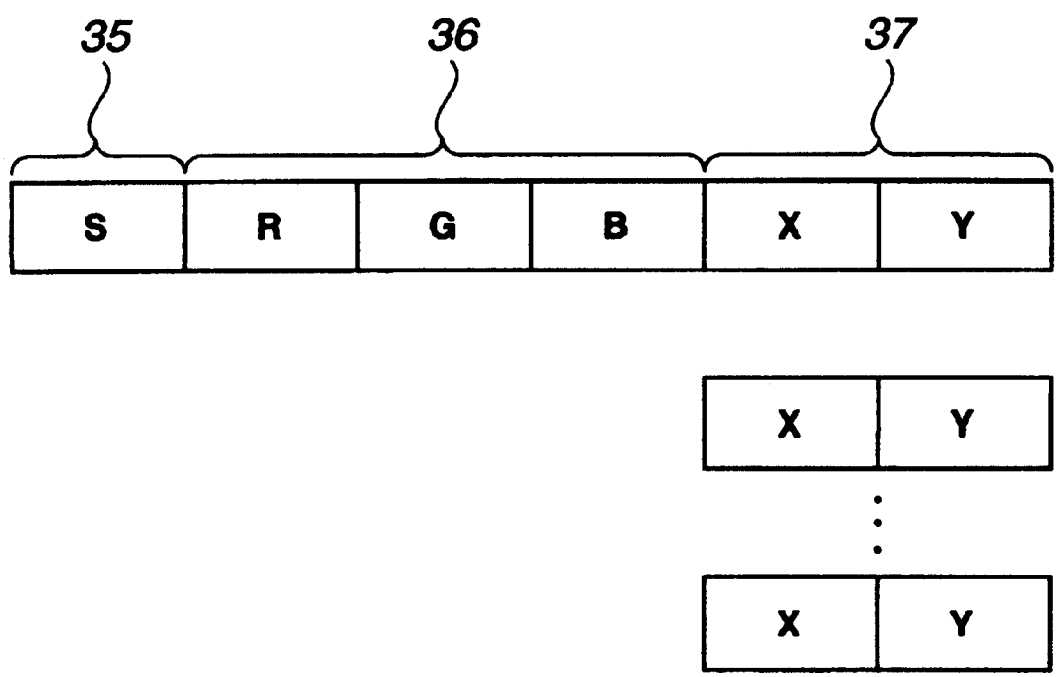
FIG. 7 is a diagram depicting the format of coded image data that the encoding apparatus is to transfer to a transmission medium.

In the encoder 5, the multiplexing section 17 multiplexes the differential coded data output from the differential coding section 16 and the coded data output from the pixel-number data encoder. The coded pixel data, thus multiplexed, is supplied from the output terminal $OUT_T$ of the encoder 5 to the transmission medium 10. FIG. 7 shows the format of the coded pixel data. One coded pixel data is composed of a pixel data item S35, the signal-level data (R, G, B) 36 of the representative pixel data item, and address data (X, Y) 37 of the group.

The transmission medium 10 may be a communication path such as a network, a disk-shaped recording medium, or a tape-shaped recording medium.

The coded pixel data transmitted through the transmission medium 10 is input to the decoding apparatus 6 via an input terminal $IN_R$.

The decoding apparatus 6 will now be described in detail, with reference to FIG. 1. The coded pixel data input to the input terminal $IN_R$ is supplied to a decoder 7. The decoder 7 decodes the signal-level data of the representative pixel data item and extracts the same from the coded pixel data of each group. The decoder 7 also decodes a plurality of address data items and extracts them from the coded pixel data of each group. The decoded value of the signal-level data is stored in bank-switched memories 9a and 9b, at storage locations based on the address data (X, Y). Then, a macro block reading section 8 reads the level data items in the macro block from the memories 9a and 9b, one after another in the order they are raster-scanned. The level data items, thus read, are supplied from an output terminal $OUT_R$.

Figure 8:
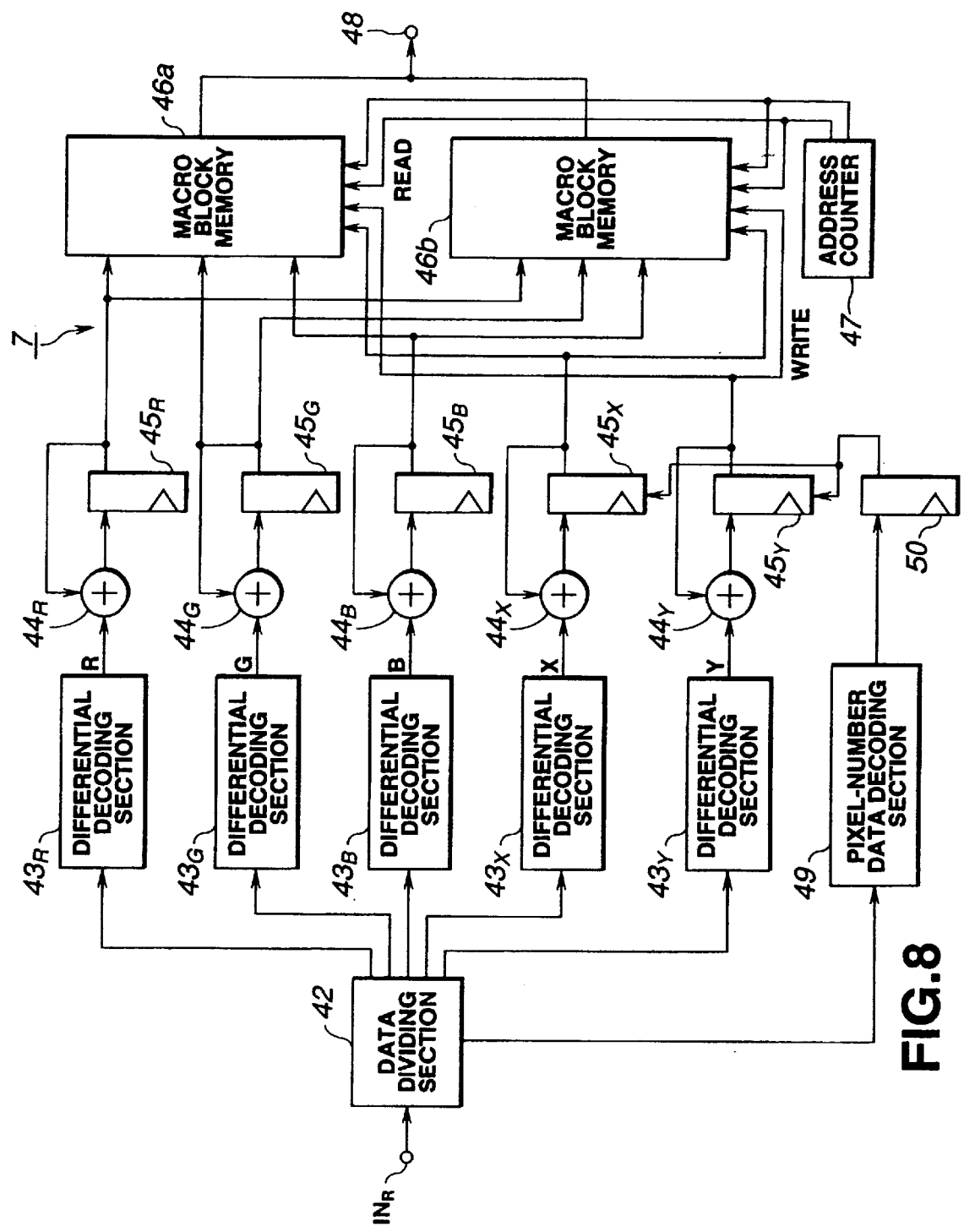
FIG. 8 is a block diagram illustrating the decoder provided in the decoding apparatus of the image-processing system.

The decoder 7 will be described in detail, with reference to FIG. 8. The decoder 7 effects the decoding method according to the present invention. The decoding method is designed to form a group of image signals in a macro block, which are pixel data items arranged in a specific order, and to decode the coded pixel data items to a plurality of image data items arranged in a particular order. The pixel data items of each group are read out in the order they are raster-scanned, in accordance with the signal-level data of the representative pixel data item, address data items of the coded pixel data items and data showing the number of the coded pixel data items, all having been extracted for the group.

To perform this decoding method, the decoder 7 comprises a data dividing section 42, a differential decoding section 43, adders 44, registers 45, and macro block memories 46a and 46b. The dividing section 42 divides the coded pixel data generated by the encoder 5 by means of multiplexing and having the format shown in FIG. 7, into signal-level data (R, G, B) 36 of the representative pixel data item, address data (X, Y) 37 of all pixel data items of the group, and data showing the number of pixel data items in the group. The differential decoding section 43 decodes differential data from the code values relating to the signal-level data and the address data, both generated by the data dividing section 42. The adders 44 and the registers 45 constitute a decoding section that generates the signal-level data and address data of each pixel data item from the decoded differential output of the differential decoding section 43. The pixel data items are read from the macro block memories 46a and 46b, in the order they are raster-scanned, after the signal-level data (R, G, B) has been written into the memories 46a and 46b in accordance with the address data (X, Y). The addresses for reading data from the macro block memories 46a and 46b are counted by an address counter 47, as addresses that accord with the order in which the pixel data items are raster-scanned. The decoder 7 further comprises a pixel-number data decoding section 49 and a register 50. The section 49 decodes the pixel-number data S35 which represents the number of pixel data items in the group and which has been generated by the data dividing section 42. The register 50 stores the pixel-number data decoded by the pixel-number data decoding section 49.

How the decoder 7 operates will be described. The dividing section 42 divides the coded pixel data input via the input terminal $IN_R$ and having the format shown in FIG. 7, into differential coded value of the signal-level data, differential coded value of the address data, and coded value of the pixel-number data. These values are supplied to the differential decoders $43_{R, 43G}$, $43_B$, $43_X$ and $43_Y$ and the differential decoding section 43 and to the pixel-number data decoding section 49. More specifically, the coded pixel data can be divided into these values by determining the number of address data items from the pixel-number data recorded in a header.

The differential values of the signal-level data, decoded by the differential decoders $43_R$, $43_G$, $43_B$, $43_X$ and $43_Y$ and the differential value of the address data are supplied to the adders $44_R$, $44_G$, $44_B$, $44_X$ and $44_Y$ that constitute the above-mentioned decoding section. To the adders $44_R$, $44_G$ and $44_B$ there are fed back the signal-level data items R, B and B of the representative pixel data item of the preceding group, which are stored in the registers $45_R$, $45_G$ and $45_B$, respectively. The signal-level data of the present representative pixel data item can therefore be decoded. The address data items X and Y of the previous pixel data item, which are stored in the registers 45X and 45Y, are fed back to the adders $44_X$ and $44_Y$. The pixel-number data stored in the register 50 is supplied to the $45_X$ and $45_Y$ and used to extract the address data.

Each output of the decoding section is supplied to the macro block memories 46a and 46b that have a bank-switching structure. The address counter 47 reads the address data that has been used in the decoding, as described above, by means of raster scanning. Thus, the image signal that has been raster-scanned is output from the macro block memories 46a and 46b and output through an output terminal 48.

In the embodiment described above, a one-frame image signal having a plurality of pixel data items is divided into a plurality of macro blocks. The pixel image items correlated to one another in each macro block form one group. The pixel data items in each group are encoded on the basis of the signal-level data representing the signal level of the representative pixel data item of the group, the address data of all pixel data items of the group and the pixel-number data showing the number of the pixel data items existing in the group. Hence, the amount of data can be reduced. In addition, the operating speed of the encoder increases because groups of pixel data items are formed, each having a representative pixel data item.

Figure 9:
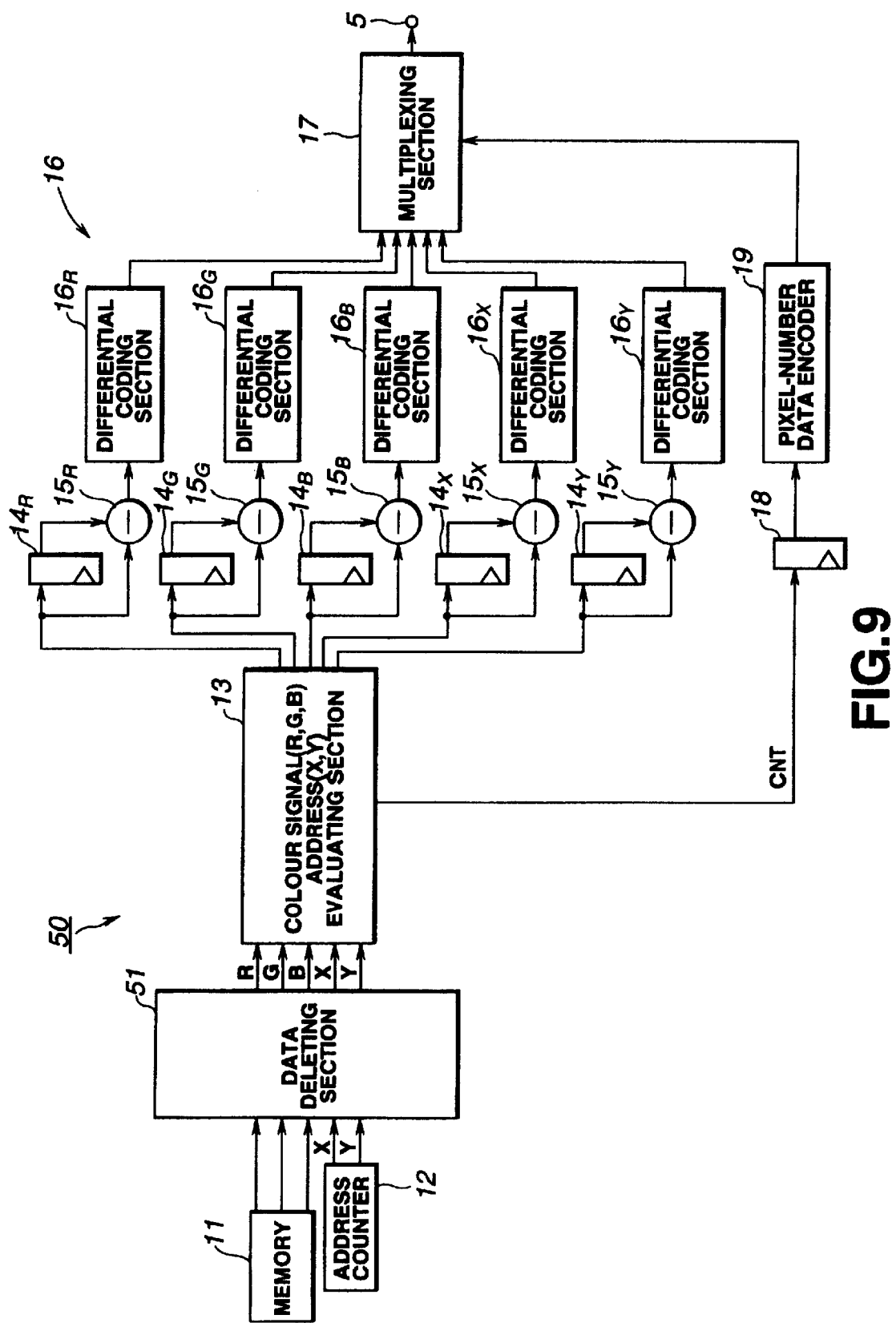
FIG. 9 is a block diagram showing an example of the encoder illustrated in FIG. 2.

In the encoding apparatus 2 shown in FIG. 1, the encoder 5 may be replaced by the encoder 50 illustrated in FIG. 9. The encoder 50 is different from the encoder 5 in that a data deleting section 51 connected to the input of the evaluating section 13. The data deleting section 51 deletes the signal-level data and address data from the pixel data. The principle of the data deleting section 51 will be related, with reference to FIGS. 10 and 11. The signal distribution of four pixels constituting a 2×2 block is converted to the four-pattern pixel density that is schematically shown in FIG. 11. The four pixels have pixel values a, b, c and d, respectively.

The pattern 1 shown in FIG. 11A is replaced by (a+b+c+d)/4 when all conditions of |a−b|<TH, |b−c|<TH, |c−d|<TH, |d−a|<TH, |a−c|<TH and |b−d|<TH are satisfied, where TH is a threshold value. The pattern 2 shown in FIG. 11B is replaced by (a+c)/2 and (b+d)/2 when only the conditions of |a−b|<TH and |c−d|<TH are satisfied. The pattern 3 shown in FIG. 11C is replaced by (a+c)/2 and (c+d)/2 when only the conditions of |a−c|<TH and |b−d|<TH are satisfied. The pattern 4 shown in FIG. 11D has the original pixel value when none of these conditions is satisfied.

The use of the encoder 50 having the data deleting section 51 can further reduce the amount of data.

Figure 12:
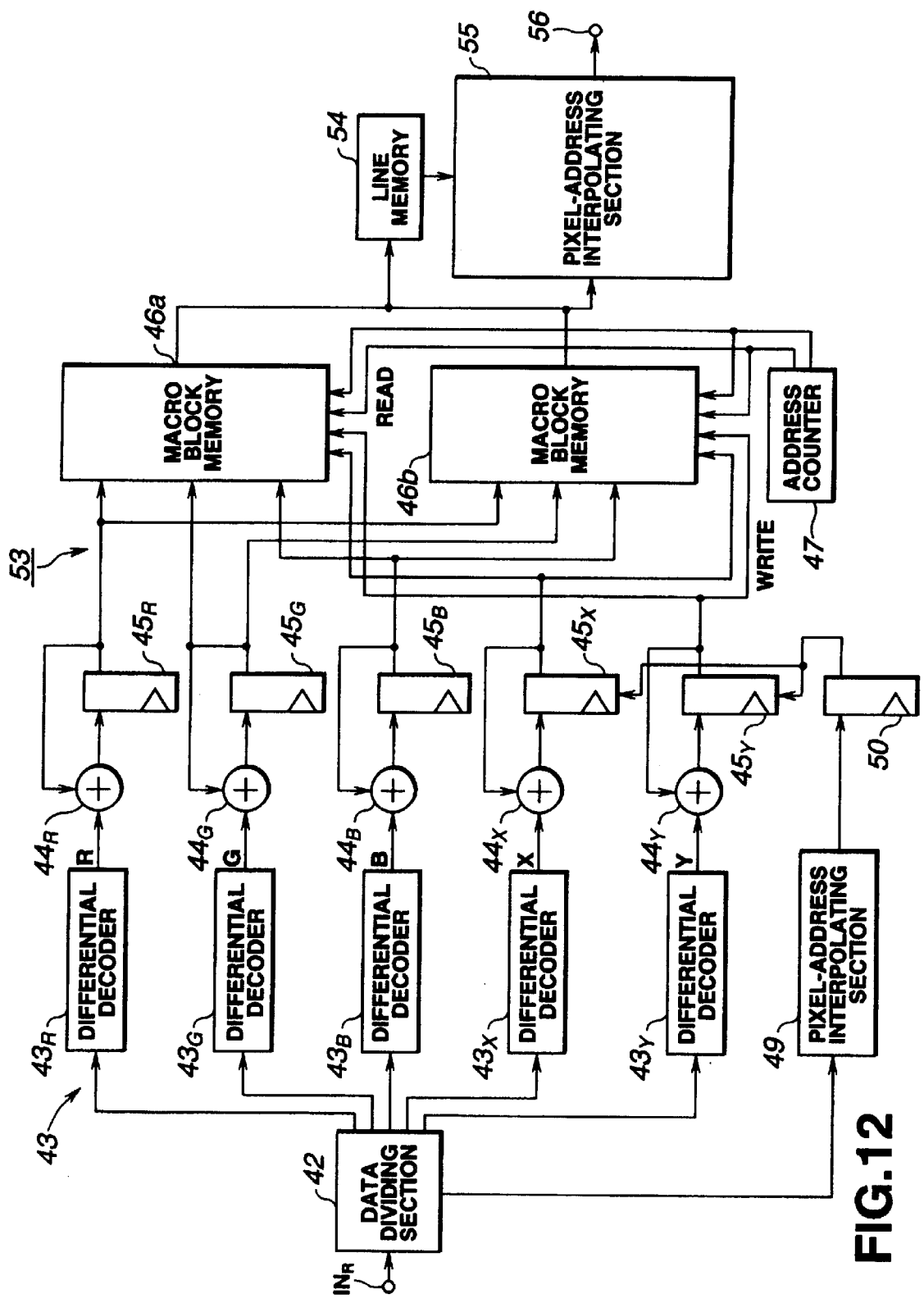
FIG. 12 is a block diagram showing an example of the decoder shown in FIG. 8.

FIG. 12 shows a decoder 53 that should be used in combination with the encoder 50. In the decoder 53, a pixel-address interpolating section 55 must perform interpolation on the image signals read from the macro block memories 46a and 46b, by using a line memory 54. The output of the section 55, i.e., the image signals interpolated, is supplied from an output terminal 56.

INDUSTRIAL APPLICABILITY

In the present invention, image signals, each consisting of a plurality of pixel data items, are divided into groups, thereby encoding image data. The image data, thus encoded, is transmitted. It is therefore possible to enhance the efficiency of encoding the values of the image signals. Since address data that is unnecessary for raster scanning is transmitted, the amount of data increases proportionally. Nevertheless, the data representing the signal values can be reduced more than the amount of data increases. As a result, the efficiency of encoding the signal values increases.

Moreover, the pixel data items, divided into groups and encoded, can be decoded by the use of a decoding apparatus that is simple in structure.

What is claimed is:

1. An encoding apparatus comprising:
    a data-grouping section for dividing a plurality of pixels of an image signal, into groups, in accordance with characteristics of the image signal; and
    an encoding section for encoding the pixels of each group on the basis of level data representing a signal level of a representative pixel of the group, address data representing addresses of said pixels in said group, and pixel-number data representing the number of pixels in said group;
    whereby a pixel is determined to belong to the group corresponding to said representative pixel when the respective differences between primary signal portions of said pixel and primary signal portions of said representative pixel are each below a predetermined threshold.

2. An encoding apparatus according to claim 1, wherein in the data-grouping section divides the pixels into groups by using, as the characteristics, correlation between the representative pixel and the other pixels.

3. An encoding apparatus according to claim 1, wherein the data-grouping section divides the pixels into groups by using, as the characteristics, correlation between the level data of the representative pixel and the level data of the other pixels and the difference between the address data of the representative pixel and the address data of the other pixels.

4. An encoding apparatus according to claim 1, wherein the data-grouping section divides the pixels included in a prescribed region, into groups.

5. An encoding apparatus according to claim 4, wherein the address data represents an address in the prescribed region.

6. An encoding apparatus according to claim 4, wherein the prescribed region is the same frame or field.

7. An encoding apparatus according to claim 6, wherein the prescribed region is the same macro block in the same frame or field.

8. An encoding apparatus according to claim 1, wherein the encoding section encodes the representative pixel of a certain group, on the basis of a difference between the level data of the representative pixel and the level data of a representative pixel of a group encoded immediately before.

9. An encoding apparatus according to claim 8, wherein the encoding section encodes the address data of the pixels, on the basis of differential values of the address data, respectively.

10. An encoding apparatus according to claim 1, wherein the encoding section encodes the pixels in the group, on the basis of the level data of the representative pixel data, the address data representing the address of said pixels in said group and pixel number data representing the number of pixels existing in the group.

11. A decoding apparatus for decoding a plurality of pixels having a predetermined order from a plurality of coded pixels which have been generated by dividing an image signal composed of pixels having the predetermined order into a plurality of groups in accordance with characteristics of the image signal and by encoding the pixels of each group on the basis of level data representing a signal level of a representative pixel of the group, address data representing addresses of said pixels in said group, and pixel-number data representing the number of pixels in a group, said decoding apparatus comprising:
    a level-data extracting section for extracting the level data from the coded pixels of each group;
    a position-data extracting section for extracting said address data from the coded pixels of each group;
    a pixel number-data extracting section for extracting said number of pixels contained in each group; and
    a data-converting section for converting the pixels of each group to the predetermined order, on the basis of the level data extracted by the level-data extracting section, address data extracted by the position-data extracting section, and the number of pixels in a group extracted by the pixel number-data extracting section;
    whereby a pixel is determined to belong to the group corresponding to said representative pixel when the respective differences between primary signal portions of said pixel and primary signal portions of said representative pixel are each below a predetermined threshold.

12. A decoding apparatus according to claim 11, wherein the plurality of coded pixels have been generated by encoding the pixels of each group by using pixel number data representing the number of pixels existing in the group.

13. A decoding apparatus according to claim 12, wherein said pixel number-data extracting section extracts from the coded pixels, the data representing the number of pixels existing in each group, and wherein the data-converting section converts the pixels of each group to the predetermined order, on the basis of the pixel number data, the level data and the address data.

14. A decoding apparatus according to claim 12, wherein the prescribed region is the same frame or field.

15. A decoding apparatus according to claim 14, wherein the prescribed region is the same macro block in the same frame or field.

16. A decoding apparatus according to claim 11, wherein the plurality of pixels of a prescribed region are divided into groups.

17. An encoding method comprising the steps of:
    dividing a plurality of pixels of an image signal, into groups, in accordance with characteristics of the image signal; and
    encoding the pixels of each groups on the basis of level data representing a signal level of a representative pixel of the group, address data representing addresses of said pixels in said group, and pixel-number data representing the number of pixels in said group;
    whereby a pixel is determined to belong to the group corresponding to said representative pixel when the respective differences between primary signal portions of said pixel and primary signal portions of said representative pixel are each below a predetermined threshold.

18. An encoding method according to claim 17, wherein the pixels are divided into groups by using, as the characteristics, correlation between the representative pixel and the other pixels.

19. An encoding method according to claim 17, wherein the pixels are divided into groups by using, as the characteristics, correlation between the level data of the representative pixel and the level data of the other pixels and the difference between the address data of the representative pixel and the address data of the other pixels.

20. An encoding method according to claim 17, wherein the pixels divided into groups are included in a prescribed region.

21. An encoding method according to claim 20, wherein the address data represents an address in the prescribed region.

22. An encoding method according to claim 20, wherein the prescribed region is the same frame or field.

23. An encoding method according to claim 22, wherein the prescribed region is the same macro block in the same frame or field.

24. An encoding method according to claim 17, wherein, in the step of encoding, the level data of the representative pixel of a certain group is encoded, on the basis of a difference between the level data of the representative pixel and the level data of a representative pixel of a group encoded immediately before.

25. An encoding method according to claim 24, wherein, in the step of encoding, the address data of the pixels are encoded, on the basis of differential values of the address data, respectively.

26. An encoding method according to claim 17, wherein, in the step of encoding, the pixels in the group are encoded, on the basis of the level data of the representative pixel data, the address data representing an address of said pixels in said group and pixel number data representing the number of pixels existing in the group.

27. A decoding method of decoding a plurality of pixels having a predetermined order from a plurality of coded pixels which have been generated by dividing an image signal composed of pixels having the predetermined order into a plurality of groups in accordance with characteristics of the image signal and by encoding the pixels of each group on the basis of level data representing a signal level of a representative pixel of the group, address data representing addresses of said pixels in said group, and pixel-number data representing the number of pixels in said group, said decoding method comprising the steps of:

extracting the level data from the coded pixels of each group;

extracting said address data from the coded pixels of each group;

extracting the number of pixels contained in each group; and converting the pixels of each group to the predetermined order, based on the level data thus extracted, the address data thus extracted, and the number of pixels in said group thus extracted;

whereby a pixel is determined to belong to the group corresponding to said representative pixel when the respective differences between primary signal portions of said pixel and primary signal portions of said representative pixel are each below a predetermined threshold.

28. A decoding method according to claim 27, wherein the plurality of coded pixels have been generated by encoding the pixels of each group by using pixel number data representing the number of pixels existing in the group.

29. A decoding method according to claim 28, wherein said step of extracting said number of pixels, from the coded pixels, the data representing the number of pixels existing in each group, and wherein in the step of converting, the pixels of each group are converted to the predetermined order, on the basis of the pixel number data, the level data and the address data.

30. A decoding method according to claim 28, wherein the prescribed region is the same frame or field.

31. A decoding method according to claim 30, wherein the prescribed region is the same macro block in the same frame or field.

32. A decoding method according to claim 27, wherein the plurality of pixels of a prescribed region are divided into groups.

\* \* \* \* \*